(12) United States Patent
Chandok et al.

(10) Patent No.: US 12,200,401 B2
(45) Date of Patent: Jan. 14, 2025

(54) OPTIMIZING MEDIA EXPERIENCE IN CONFERENCING WITH DIVERSE PARTICIPANTS

(71) Applicant: Apple Inc., Cupertino, CA (US)

(72) Inventors: Gurtej Singh G. Chandok, Sunnyvale, CA (US); Christopher M. Garrido, Santa Clara, CA (US); Chieh Lu, San Jose, CA (US); Daniel B. Pollack, Cupertino, CA (US); Karthick Santhanam, Campbell, CA (US); David L. Biderman, Los Gatos, CA (US); Jinbo Qui, San Jose, CA (US); Dazhong Zhang, Saratoga, CA (US); Jose A. Lozano Hinojosa, Santa Clara, CA (US); Igor Kobzar, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/661,947

(22) Filed: May 4, 2022

(65) Prior Publication Data

US 2022/0394212 A1    Dec. 8, 2022

Related U.S. Application Data

(60) Provisional application No. 63/197,214, filed on Jun. 4, 2021.

(51) Int. Cl.
*H04N 7/15* (2006.01)
*H04N 19/40* (2014.01)
(52) U.S. Cl.
CPC ............. *H04N 7/152* (2013.01); *H04N 19/40* (2014.11)

(58) Field of Classification Search
CPC .......... H04N 19/40; H04N 7/152; H04N 7/15; H04N 7/147
USPC ............................................ 348/14.01–14.16
See application file for complete search history.

(56) References Cited

U.S. PATENT DOCUMENTS

| | | |
|---|---|---|
| 10,931,725 B2 | 2/2021 | Garrido et al. |
| 2006/0215630 A1* | 9/2006 | Hwang ............... H04L 65/4038 370/351 |
| 2011/0310216 A1* | 12/2011 | Lee ........................ H04N 19/34 375/E7.126 |
| 2013/0208075 A1* | 8/2013 | Lu ....................... H04L 65/4038 348/E7.083 |
| 2014/0111603 A1* | 4/2014 | Khan ........................ H04N 7/15 348/E7.083 |
| 2017/0006078 A1* | 1/2017 | Leung ....................... H04N 7/15 |
| 2019/0104163 A1* | 4/2019 | Garrido ............... H04L 65/1089 |
| 2021/0399971 A1 | 12/2021 | Shiang et al. |

* cited by examiner

*Primary Examiner* — Duc Nguyen
*Assistant Examiner* — Assad Mohammed
(74) *Attorney, Agent, or Firm* — Womble Bond Dickinson (US) LLP

(57) ABSTRACT

Participant systems in an audiovisual (AV) conferencing can, in one embodiment, use methods to ensure that all participants have a common platform to support AV conferencing, such as a common codec, and also attempt to provide higher quality AV conferencing (e.g., better than the common codec) based on available bandwidth and other criteria. The participant systems can use the common codec as a fallback platform when bandwidth or other criteria dictate a reduction in the quality of the AV conferencing. Other embodiments are also disclosed.

18 Claims, 7 Drawing Sheets

OPTIMIZING MEDIA EXPERIENCE IN CONFERENCING WITH DIVERSE PARTICIPANTS

This application claims the benefit of U.S. Provisional Patent Application No. 63/197,214 filed Jun. 4, 2021, which is incorporated herein by reference.

BACKGROUND

The field of this disclosure relates to real time communication, often through a computer network or set of networks.

Real time communication, such as video telephony, using data processing systems that can provide audio and video during the communication has become very popular. Currently, there are many known examples of such communications, including for example, FaceTime from Apple Inc., WebEx from Cisco, Teams from Microsoft, Zoom, etc. These video telephony communications allow participants to talk in real time, which is similar to conventional audio telephony, and also send and receive images while talking so that the participants can see each other while talking or see their computer screens or see other content. These communications can resemble an in-person meeting and can be referred to as a conference or an audiovisual (AV) conference.

It is often the case that the participants in a conference are using different types of data processing systems which may have different media capabilities. For example, one participant's data processing system may be a laptop computer executing a version of a Windows operating system and another participant's data processing system may be a smart phone executing a version of an Android operating system and a third participant's data processing system may be an iMac desktop computer executing a version of a macOS operating system. These different systems can have different media capabilities such as different video codecs. As a result of this difference, the different systems are forced to use the lowest common configuration, but this will not result in a most optimal experience for everyone in the conference. An alternative to using the lowest common configuration can be an approach that uses a server that performs media transcoding between the two different systems. However, when end-to-end security (e.g., encryption that makes the content at the server opaque) is required, it is not possible for a server to perform media transcoding because the server cannot decrypt the content.

SUMMARY OF THE DESCRIPTION

Participant systems in an audiovisual (AV) conferencing can, in one embodiment, use methods to ensure that all participants have a common platform to support AV conferencing, such as a common codec and a common encryption method, and also attempt to provide higher quality AV conferencing (e.g., better than the common codec) based on available bandwidth and other criteria to a subset of the participant systems that support the better codec. The AV conferencing can be used with end-to-end encryption so that no server media transcoding is required and no server decryption is required, and the use of a common codec and common encryption method can allow different types of data processing systems to participate in the conference. The participant systems can also use the common codec as a fallback platform when bandwidth or other criteria dictate a reduction in the quality of the AV conferencing. In one embodiment, at least some of the participant systems should be able to use media codecs that are better than the common codec; for example, when a subset of participant systems support a better codec, those participant systems can send and receive streams encoded using the better codec and also send and receive streams encoded with a common codec for those participants that will use the common codec (e.g., because they do not have the better codec or they have resorted to use of the common codec due to, for example, network bandwidth reduction). In the case of a fallback, participant systems should not have to incur the cost of encoding and transmitting streams with better media codecs if no other participant in the conference is capable of consuming those streams. Also in the case of a fallback, a participant system that cannot sustain encoding and transmitting multiple streams (such as a common codec stream and a stream encoded with a better codec), can transmit only the common codec stream and still be involved in the conference.

One aspect of this disclosure relates to on-demand creation of a common codec stream in response to a participant (e.g., a third data processing system) joining a conference. According to this aspect, a method can be performed by a first data processing system in an environment that includes the first data processing system and a second data processing system and a third data processing system and one or more servers, and the method can include the following operations: transmitting, by the first data processing system to the server, codec capabilities of the first data processing system, the codec capabilities of the first data processing system indicating a first set of codecs in the first data processing system that are available for use in an audiovisual (AV) conference; receiving, by the first data processing system, a second set of codec capabilities of the second data processing system, the second set of codec capabilities indicating a second set of codecs in the second data processing system that are available for use in the AV conference; receiving, at the first data processing system, a request from the second data processing system to receive a first stream, encoded with a first codec, in the AV conference, the first codec in the first set of codecs in the first data processing system; transmitting, by the first data processing system to the server, the first stream for delivery to the second data processing system; receiving, by the first data processing system, a request from the third data processing system for a second stream, encoded with a second codec, in the AV conference, the second codec being in the first set of codecs and being different than the first codec; creating, on demand and in response to the request from the third data processing system, the second stream in the AV conference; and transmitting the second stream to the server for delivery to the third data processing system while the first data processing system continues to transmit the first stream to the server for delivery to the second data processing system.

In one embodiment of this method, each codec in the first set of codecs and in the second set of codecs is configured to compress video content in an AV conference for transmission to other participants in the AV conference and is configured to decompress video content received in the AV conference, and the second codec is a codec that is common to and available for use in the first, the second and the third data processing systems. The method can support different types of data processing systems; for example, the first and the second data processing systems can execute one or more versions of a first operating system (e.g., iOS from Apple Inc.) during the AV conference and the third data processing system executes a second operating system (e.g., Android from Google) during the AV conference. In this example, the first and second data processing systems can use FaceTime applications to participate in the AV conference and the server can be a server in a FaceTime infrastructure, while the third data processing system uses a web browser to participate in the AV conference.

In one embodiment of this method, the first data processing system can monitor one or more of: uplink bandwidth from the first data processing system, downlink bandwidth to the first data processing system, thermal data about the thermal state of the first data processing system, or battery state about a battery in the first data processing system; and the first data processing system can, in response to one or more conditions determined from the monitoring, switch from transmitting to the second data processing system the first stream to transmitting to the second data processing system the second stream. In one embodiment, this switch can occur by associating the second stream with a stream identifier of the first stream to cause the server to forward the second stream to the second data processing system. In another embodiment, the switch can occur by: transmitting, by the first data processing system, an indication to the server, for delivery to the second data processing system, that the first data processing system has or will stop transmitting the first stream for delivery to the second data processing system; receiving a request, from the second data processing system, for the second stream; and transmitting, by the first data processing system, the second stream to the server for delivery to the second data processing system.

A method performed by a server according to this aspect of on-demand creation of a common codec stream can include the following operations: receiving, by the server from the first data processing system, codec capabilities of the first data processing system, the codec capabilities of the first data processing system indicating a first set of codecs in the first data processing system that are available for use in an audiovisual (AV) conference; transmitting, by the server to the first data processing system, a second set of codec capabilities of the second data processing system, the second set of codec capabilities indicating a second set of codecs in the second data processing system that are available for use in the AV conference; transmitting, by the server to the first data processing system, a request from the second data processing system to receive a first stream, encoded with a first codec, in the AV conference, the first codec in the first set of codecs in the first data processing system; receiving, by the server from the first data processing system, the first stream for delivery to the second data processing system; transmitting, by the server to first data processing system, a request from the third data processing system for a second stream, encoded with a second codec, in the AV conference, the second codec being in the first set of codecs and being different than the first codec; and receiving the second stream at the server for delivery to the third data processing system while the server continues to transmit the first stream to the second data processing system.

Another aspect of this disclosure relates to the use of better or optimal codecs for at least a subset of participant systems in a conference. According to this aspect, a method can be performed by a first data processing system in an environment that includes the first data processing system and a second data processing system and a server, and the method can include the following operations: transmitting, by the first data processing system to the server, codec capabilities of the first data processing system, the codec capabilities of the first data processing system indicating a first set of codecs in the first data processing system that are available for use in an audiovisual (AV) conference; receiving, by the first data processing system, a second set of codec capabilities of the second data processing system, the second set of codec capabilities indicating a second set of codecs in the second data processing system that are available for use in the AV conference; transmitting, by the first data processing system to the server, a request for a first stream encoded by a first codec at the second data processing system, the request based on criteria at the first data processing system of a highest quality codec that is common to the first and the second sets of codecs.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a participant system or a server system that can be used in a conference such as an AV conference described herein.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Audio-video conferencing provides for the reception and transmission of audio and/or video signals (usually as streaming content) by user devices or systems (e.g., at different locations), for communication between users in real-time. In some cases, two users may utilize audiovisual conferencing to communicate with each other in one-to-one communication at their respective devices. In other cases, multiway audiovisual conferencing may be utilized by more than two users to participate in a real-time, group conversation.

In some systems of multiway audiovisual conferencing, network degradation may be experienced by one or more of the participant systems. In the one-to-one audiovisual conferencing example, the two participating systems may both switch from a high quality/bitrate stream to a lower quality/bitrate stream, in order to accommodate for the bandwidth degradation. However, when there are more than two participants in an audiovisual conference, switching all of the participant devices to a lower quality/bitrate content stream because a single participant device has bandwidth constraints may result in a degradation of the audiovisual conference experience for all of the participants. Switching becomes more complicated when the participant systems are different types of systems, such as an iPhone executing FaceTime on a version of iOS and a smart phone executing a version of an Android operating system.

Figure 1:
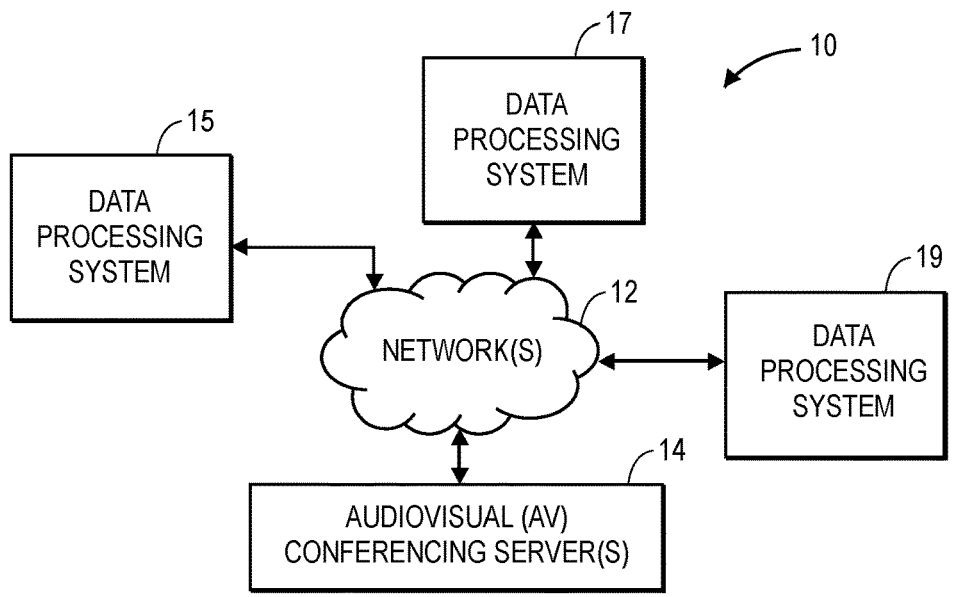
FIG. 1 shows an example of a conferencing environment that can be used with the embodiments described herein.

FIG. 1 shows an example of a conferencing environment 10 that can be used with one or more of the embodiments described herein. Not all of the depicted components may be used in all implementations of embodiments, however, and one or more implementations may include additional or different components than those shown in the figure. Variations in the arrangement and type of the components may be made in accordance with the embodiments described herein, and additional components, different components, or fewer components may be provided in accordance with the embodiments described herein.

The conferencing environment 10 includes data processing systems 15, 17, and 19, one or more computer networks 12 (e.g., the Internet), and one or more AV conferencing servers 14. The one or more networks 12 may communicatively (directly or indirectly) couple, for example, any two or more of the data processing systems 15, 17 and 19 and the one or more servers 14 to allow for the exchange of data among the systems and the one or more servers. In one or more implementations, the one or more networks 12 may be an interconnected network of devices that may include, and/or may be communicatively coupled to, the Internet. For explanatory purposes, the conference environment 10 is illustrated in FIG. 1 as including systems 15, 17 and 19 and one or more servers 14; however, the conferencing environment 10 may include any number of electronic devices or data processing systems and any number of servers, often millions of devices or systems dispersed over large geographic regions. In addition, the conferencing environment 10 can include different types of servers that perform messaging operations (e.g., transmission of push notifications or push messages between the participant systems) and registration operations (e.g., FaceTime registration servers used to register users of the FaceTime AV conferencing system) and other operations used to set up conferencing among the participant systems, such as the data processing systems 15, 17, and 19. The one or more servers 14 may be a cloud of servers that are used to facilitate AV conferencing among data processing systems such as the systems 15, 17, and 19. In one embodiment, the one or more servers 14 can include the server 108 shown and described in U.S. Pat. No. 10,931,725 which describes a server used in a group FaceTime architecture or infrastructure; other servers (e.g., other selective forwarding servers) described in that US patent can also be used in the embodiments described in this disclosure.

The data processing systems 15, 17, and 19 may be, for example, a desktop computer, a portable computing device such as a laptop computer, a tablet computer (e.g., an iPad), a smart phone (e.g., an iPhone or an Android smart phone), a smart speaker (e.g., an Echo or Echo Show from Amazon), a peripheral device (e.g., a digital camera, headphones), a gaming device or system, a wearable device such as a headmounted display or glasses or smartwatch and the like, or any other appropriate device or consumer electronic device that includes, for example, one or more wireless interfaces, such as WLAN radios, WiFi radios, cellular radios, Bluetooth radios, Zigbee radios, near field communication (NFC) radios, and/or other wireless radios. These data processing systems can be configured to participate in audiovisual conferencing, for example, where the data processing systems 15, 17, and 19 (also referred to as participant devices or participant systems) may participate in a group conversation in which video and/or audio content streams are transmitted between the participant devices in the AV conference. In the context of the embodiments described herein, an AV conference will be understood to mean a communication where at least one of audio or video is transmitted, as streaming content, between the participant systems; normally, in one embodiment, both audio and video are transmitted (assuming at least some participant systems are equipped with a camera), but in some situations only audio may be transmitted when network bandwidth degrades to the point that only audio transmission can be supported from some or all participant systems. In one embodiment, the transmission of audio only can occur at any point during an AV conference (or even during the entirety of the AV conference). In one embodiment, at least some of the participant systems can have an AV conferencing application (e.g., the FaceTime application) installed on the participant system; the AV conferencing application on the sending device (e.g., data processing system 15) can facilitate in transmitting streaming content for receipt by at least one other participant that also has the same AV conferencing application (or a version of that application) with the same media capabilities as the sending device. In one embodiment, one or more participants may not include a dedicated AV conferencing application (e.g., they do not include the FaceTime application), and they may use a web browser (or similar application) to participate in the AV conference. In this case, such participant systems can be referred to as web participants, and they may use known protocols, such as webRTC or a quick relay protocol to participate in the AV conference. In one embodiment, the audio and video content can be encrypted with end to end encryption so that the intervening servers along the path cannot decrypt the content.

Figure 2A:
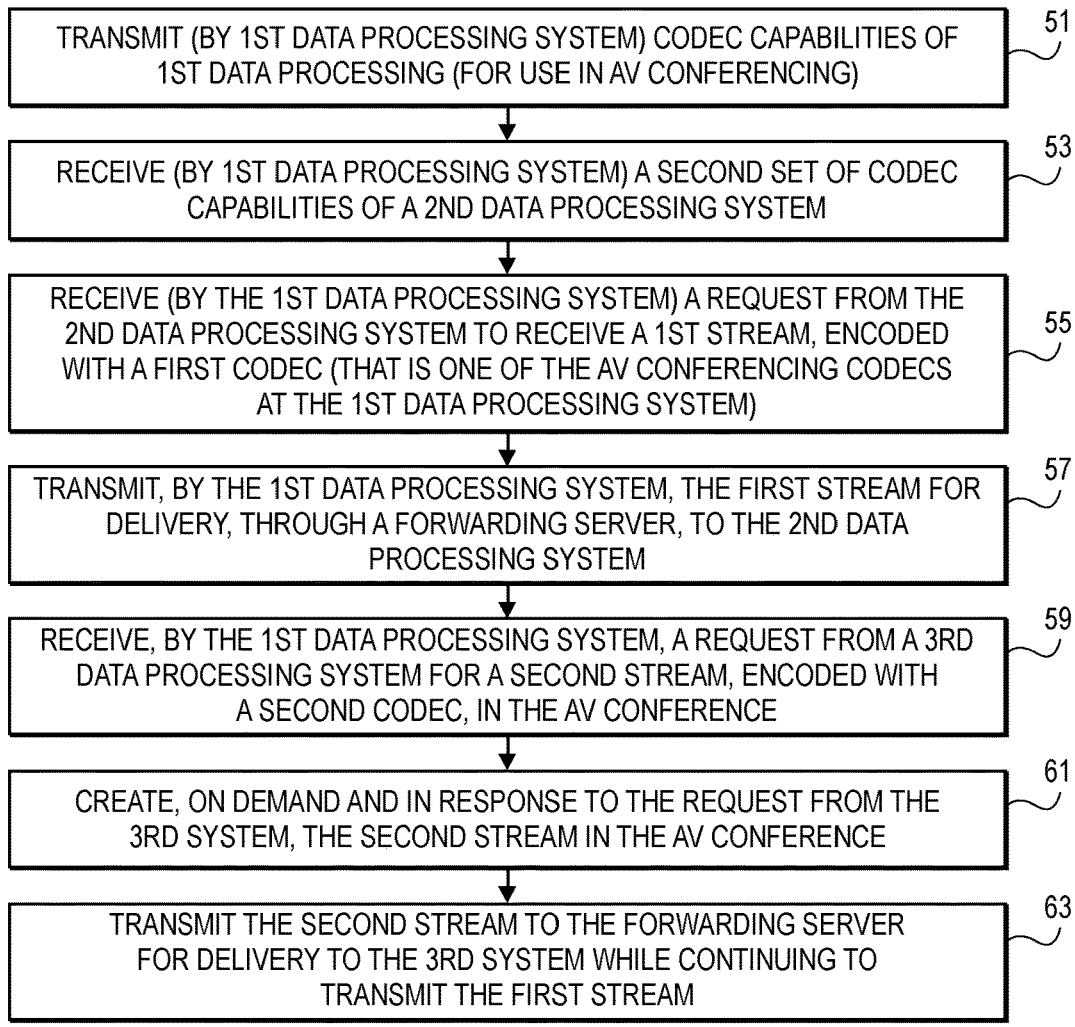
FIG. 2A is a flowchart that shows a method according to one embodiment that creates a new stream (e.g., a stream encoded with a common codec) for a new participant system while maintaining an existing stream for another participant system.

A method according to one embodiment will now be described while referring to FIGS. 2A, 2B and 2C. In this method, a new participant system (e.g., participant system 107, which may be a web participant in FIG. 2B) that has different media capabilities than the existing participant systems joins an ongoing AV conference (or at least an initiated AV conference) between existing participant systems, thereby causing the existing participant systems to create new streams with a codec that is common among the participant systems while the original two existing participant systems (e.g., participant systems 103 and 109 in FIG. 2B) continue to send and receive content to each other using a different (e.g., better) codec. A codec is a system (e.g., software and hardware) that compresses content for transmission from a device and decompresses received content for presentation (e.g., display of images and/or playing of audio) at the device. FIG. 2A shows a method performed by one of the existing participant systems (e.g., participant system 103), and FIG. 2C shows a method performed by a forwarding server (e.g., forwarding server 105 in FIG. 2B). The method shown in FIG. 2A can begin after an initiation of the AV conference; this initiation can occur, for example, when a user at participant system 103 selects other participant(s) via an audiovisual conferencing application, and/or may initiate the audiovisual conference from a different mode of communication, such as group text messaging, a group voice call, etc. For example, the participants may be selected from contacts included within a contact address book stored on the participant system 103. The user may initiate the audiovisual conference by selecting an appropriate user interface element provided by the audiovisual conferencing application or contact address book application or text messaging application or voice call application, thereby prompting the invited participants, at their respective devices (e.g., the participant systems 107 and 109), to accept or decline participation in the audiovisual conference.

Figure 2B:
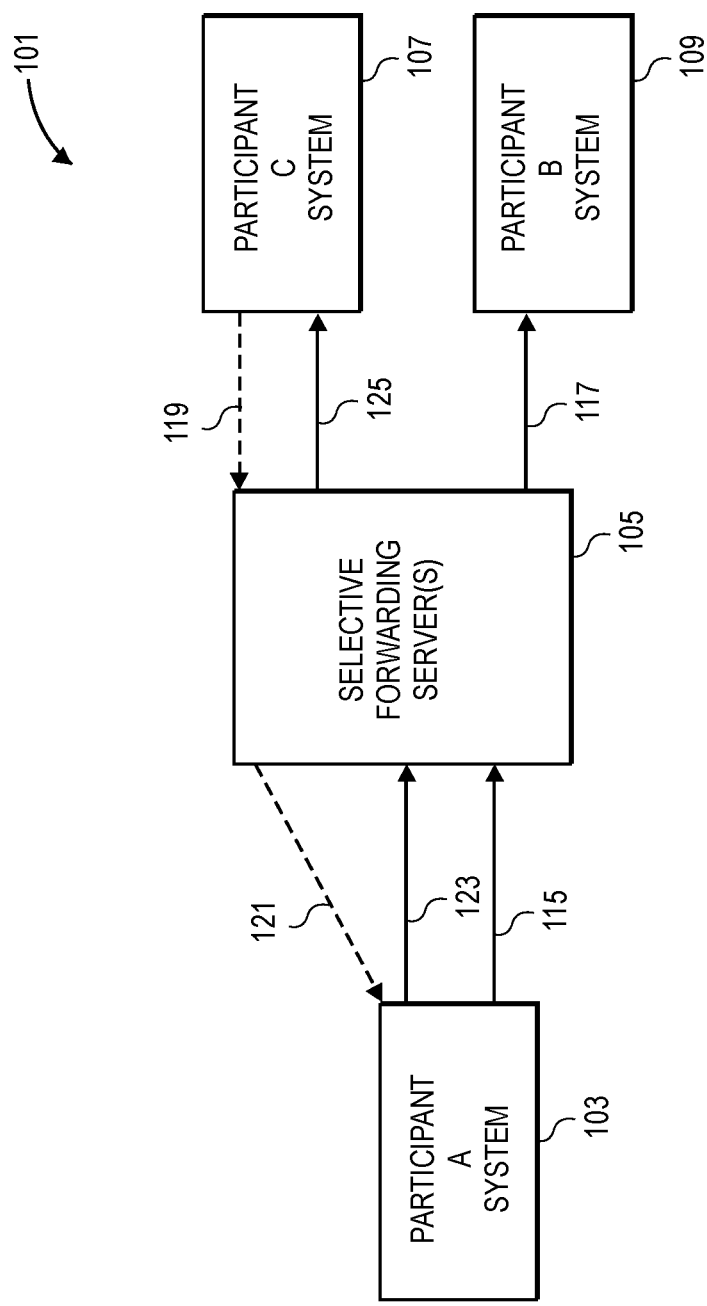
FIG. 2B shows an example of a set of participant systems and a server that can perform the method shown in FIG. 2A.
Figure 2C:
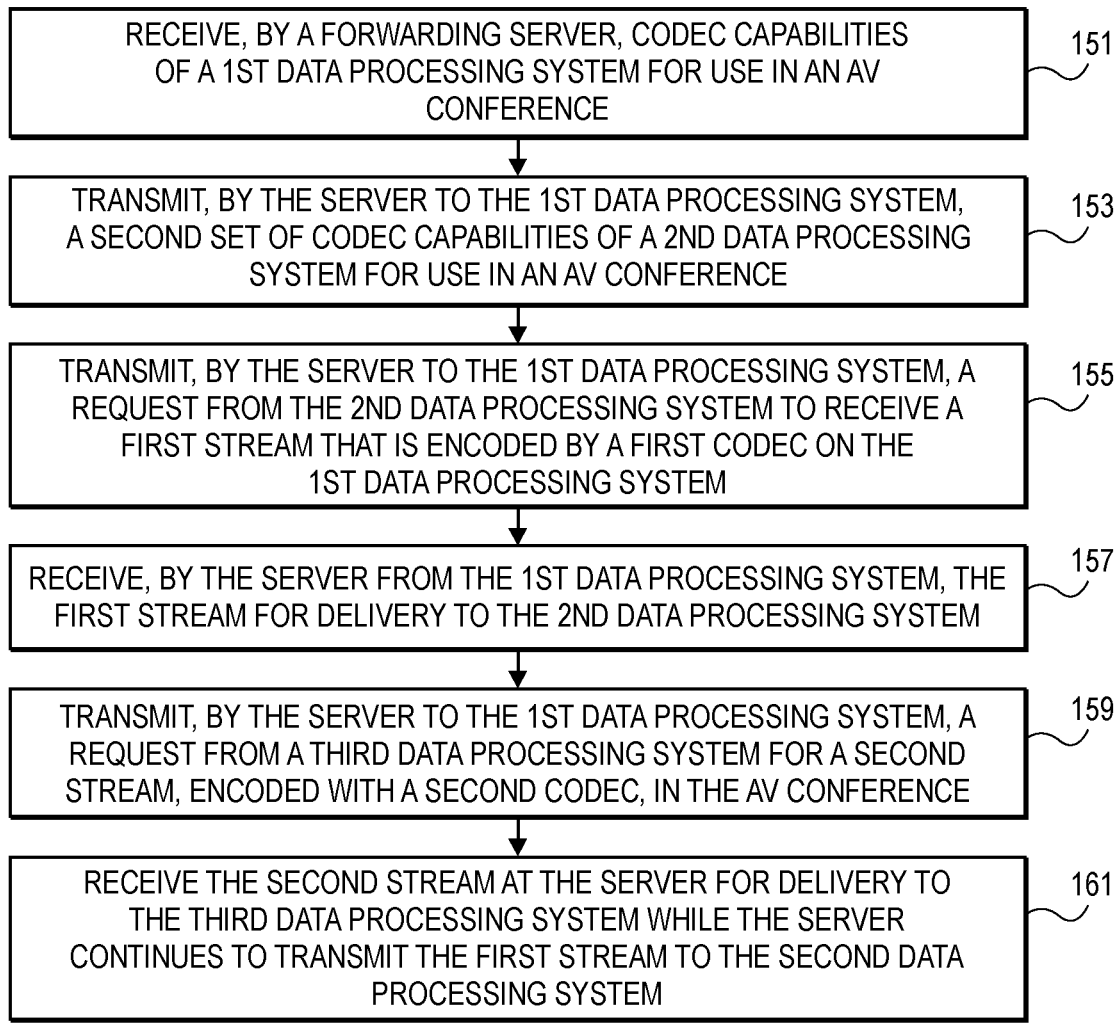
FIG. 2C is a flowchart that shows a method that can be performed by a server system in FIG. 2B.

In operation 51 in FIG. 2A, a first data processing system (e.g., participant system 103 in FIG. 2B), transmits its codec capabilities (e.g., a first set of codec capabilities) for use in an AV conference; this transmission can be directed at and received by a selective forwarding server, such as selective forwarding server 105 in FIG. 2B (or to a setup server that facilitates the AV conference). In one embodiment, the content of this transmission can then be forwarded, by the selective forwarding server, to other participant systems when they join the AV conference. The codec capabilities (transmitted in operation 51) can be an exhaustive list of all available codecs (both audio and video) at the first data processing system that are available for use in the AV conference and can also include a list of all available encryption methods (for end-to-end encryption) and other available capabilities (e.g., loss recovery techniques) for use in the AV conference. In operation 53, the first data processing system (e.g., the participant system 103 in FIG. 2B) can receive a second set of codec capabilities from a second data processing system (e.g., participant system 109 in FIG. 2B), and this received second set can be an exhaustive list of all available codecs (both audio and video) that are available for use in the AV conference and can also include a list of all available encryption methods (for end-to-end encryption) and other available capabilities (e.g., loss recovery techniques) for use in the AV conference. In operation 55, the first data processing system (the participant system 103 in FIG. 2B) can receive a request from the second data processing system (e.g., participant system 109 in FIG. 2B) to receive a first stream of content (e.g., video) encoded with a first codec (that is one of the codecs in the set of capabilities transmitted in operation 51 and is one of the codecs in the second set of capabilities). In one embodiment, in response to the request received in operation 55, the first data processing system can transmit, in operation 57, a first stream for delivery through a forwarding server (e.g., the forwarding server 105 in FIG. 2B) to the second data processing system. The first stream can be encoded by a high or the highest quality codec (based upon, for example, content resolution or other parameters) that is common to both the first data processing system and the second data processing system.

In the example shown in FIG. 2B, the participant system 103 transmits, as part of operation 57, the first stream 115 to the forwarding server 105 which, in turn, forwards the first stream as stream 117 to the participant system 109 as shown in FIG. 2B. The first stream can be encoded, when circumstances allow, with the highest quality codec (e.g., first codec) that is common to both the first (participant system 103) and the second (participant system 109) systems to allow both participant systems to experience the best possible quality of video or other content. The participant system 109 can also transmit to the participant system 103 (through the forwarding server 105) content that is encoded by the first codec that is common to the two systems 103 and 109, which content is received, decompressed/decoded and presented by the participant system 103.

When a third participant (e.g., participant system 107 in FIG. 2B) joins the AV conference, the participant system 103 in FIG. 2B receives, in operation 59 in FIG. 2A, a request (e.g., request or subscription 121 shown in FIG. 2B) from the third participant for a second stream encoded with a second codec, which can be a common codec that is available at all three participants (participant systems 103, 107 and 109 shown in FIG. 2B) and is different than the first codec and can be a lower quality codec (in terms of one or more of picture quality or lossy behavior or resolution, etc.). The request 121 is forwarded by forwarding server 105 after the forwarding server receives the request or subscription 119 from the participant system 107. In one embodiment, the third participant can be a web participant does not include the first codec used by participant systems 103 and 109 to send and receive the first stream 115; in one embodiment, the forwarding server can attempt to verify that all participant systems include at least one common codec that is available at all participant systems in the AV conference. In response to the request in operation 59, the first data processing system, in operation 61, creates a second stream of content (the second stream 123 shown in FIG. 2B) for the AV conference that is encoded by the second codec which can be the common codec. The second stream can be captured, in one embodiment, by the same camera on the first data processing system that also captures content (e.g., video) for the first stream. In operation 63 of FIG. 2A, the participant system 103 transmits the on-demand second stream 123 to the forwarding server 105 shown in FIG. 2B. The second steam 123 is then forwarded by the forwarding server 105 as second stream 125 to the participant system 107 as shown in FIG. 2B. The participant system 103 can continue to create and transmit the first stream 115 while transmitting the second stream 123. The approach shown in FIGS. 2A and 2B allows the participant systems 103 and 109 to continue to use a better codec than the common codec while permitting participant system 107 to join the AV conference. Thus, participant systems 103 and 109 can use the first codec to send and receive content (e.g., video) between them while sending and receiving content (e.g., video) from the participant system 107 using the second codec. While FIG. 2B shows the transmissions from participant system 103, it will be appreciated that participant system 103 also receives content from participant systems 107 and 109, and participant systems 107 and 109 also transmit content to the other systems so that each of the three participant systems in FIG. 2B sends content to the other participant systems and receives content from the other participant systems.

FIG. 2C shows a method that can be performed by a forwarding server (e.g., forwarding server 105) when participant system 107 joins the AV conference between participant systems 103 and 109. The method in FIG. 2C can be performed while the first participant system (e.g., participant system 103) performs the method shown in FIG. 2A. In operation 151 shown in FIG. 2C, the forwarding server can receive codec capabilities of the first data processing system (e.g., participant system 103 in FIG. 2B); these codec capabilities can then be forwarded to other participant systems in the AV conference. In operation 153 in FIG. 2C, the server can receive from a second data processing system (e.g., the participant system 109 in FIG. 2B) a second set of codec capabilities (e.g., an exhaustive list of available codecs for the AV conference) and then transmit the second set of codec capabilities to the first data processing system. This exchange of codec capabilities allows each participant system to see what capabilities are available at each participant system to allow each participant system to select a desired stream encoded by a desired codec in the AV conference. In operation 155 in FIG. 2C, the forwarding server can transmit to the first data processing system (e.g., participant system 103 in FIG. 2B) a request, from the second data processing system, to receive a first stream that is encoded by a first codec on the first data processing system (where the first codec in the list of available codecs at the first data processing system). Then in operation 157, the forwarding server receives the requested first stream for delivery to the second data processing system, and the forwarding server then forwards the first stream to the second data processing system. Of course, the forwarding server can also receive a request from the first data processing system to receive a stream from the second data processing system that is encoded with the first codec at the second data processing system (where the codecs used at the first and second data processing systems can be the same for the streams they send to each other), and the forwarding server can receive the stream from the second data processing system and forward that stream to the first data processing system.

In operation 159, the forwarding server receives a request from a third data processing system (e.g., participant system 107 in FIG. 2B) for a second stream encoded with a second codec that is common to the three participant systems in FIG. 2B, and the forwarding server transmits the request to the first and second data processing systems (participant systems 130 and 109). Then in operation 161, the forwarding server receives the requested second stream (encoded with the second codec) and forwards the second stream to the third data processing system while the forwarding server continues to forward streams encoded with the first codec to the first and second data processing systems. This permits the participant systems 103 and 109 to continue to use a better codec (the first codec) than the common codec (second codec) while permitting participant system 107 to join the AV conference. In one embodiment, the first and second data processing systems can be devices that execute versions of the same operating system (e.g., versions of iOS) and share the same media capabilities and use the same AV conferencing application (e.g., FaceTime), while the third data processing system can be a device that executes a different operating system (e.g., an Android operating system) and does not include the FaceTime AV conferencing application.

Figure 3A:
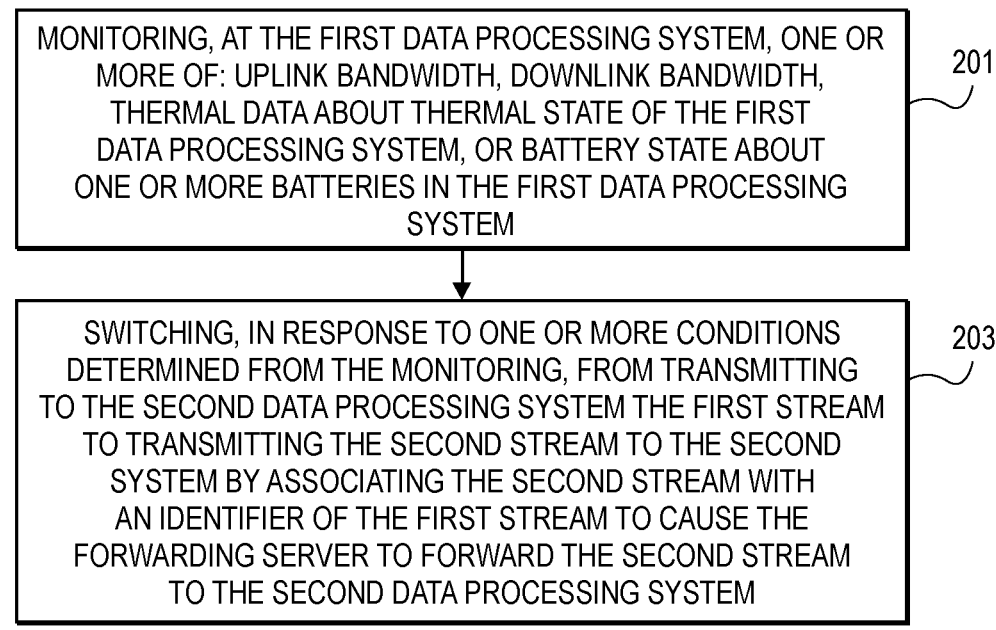
FIG. 3A is a flowchart that shows a method according to one embodiment in which a participant system falls back to a second stream using a different codec such as a common codec.
Figure 3B:
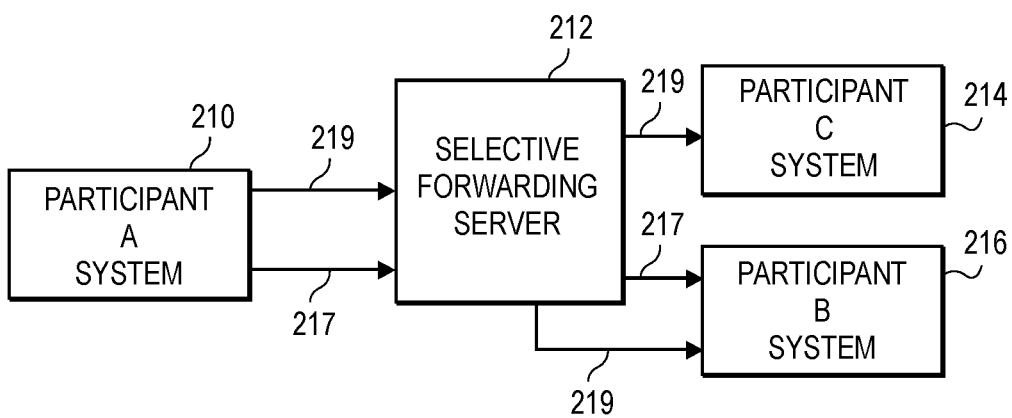
FIG. 3B shows an example of a set of participant systems and a server that can perform the method shown in FIG. 3A.
Figure 4A:
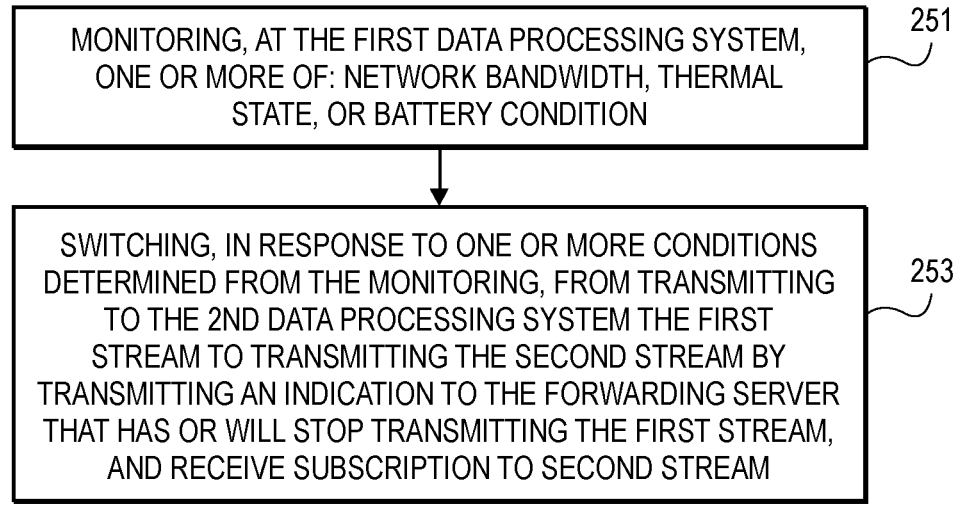
FIG. 4A is a flowchart that shows a method according to another embodiment in which a participant system falls back to a second stream using a different codec such as a common codec.
Figure 4B:
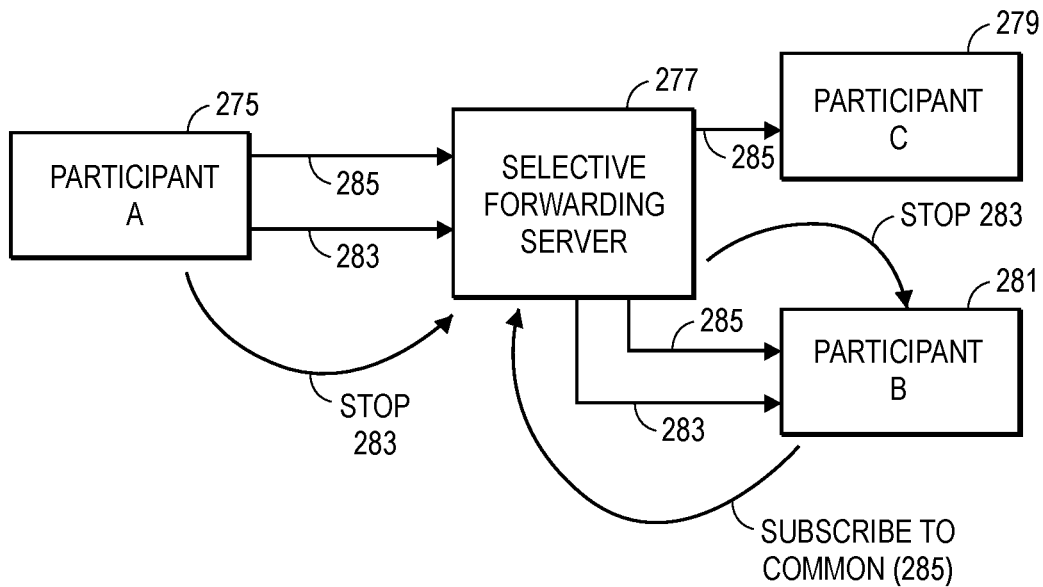
FIG. 4B shows an example of a set of participant systems and a server that can perform the method shown in FIG. 4A.

In one embodiment, the participant systems that use the better codec can continue to do so while conditions (e.g., network bandwidth, battery levels, thermal status) allow this use; however, it is possible that conditions will change and require fallback approaches that switch to the use of the common codec. FIGS. 3A and 3B show one implementation of a fallback approach and FIGS. 4A and 4B show another implementation of a fallback approach.

In the method shown in FIG. 3A, the participant systems are not required to provide signaling about the change in streams; rather, each participant is configured to be ready to switch to the use of the common codec in a fallback situation upon receipt of content encoded with the common codec. In the context of the environment shown in FIG. 2B, at least one participant will already be using the common codec. In operation 201 in FIG. 3A each participant system (e.g., participant systems 210 and 216 in FIG. 3B) monitors its local state, which can include upload bandwidth, download bandwidth, thermal data about the thermal state of the system (e.g., is the device getting too hot while it has been sending multiple streams in the AV conference?), and battery state of one or more batteries (e.g., has the battery been drained below one or more thresholds?).

This monitoring can occur periodically over time during the AV conference. U.S. provisional patent application No. 63/041,549, filed Jun. 19, 2020 (by Hsien-Po Shiang, et. al. and entitled HIGH FREQUENCY PROBING FOR NETWORK BANDWIDTH ESTIMATION USING VIDEO DATA IN REAL-TIME VIDEO CONFERENCE) provides examples of how the bandwidth can be monitored during an AV conference. Thus, each participant system such as participant systems 210, 214 and 216 in FIG. 3B can monitor these states to determine whether a condition exists that requires a fallback to the common codec. For example, if network bandwidth (e.g., upload bandwidth) for the participant system degrades too much to support transmission of multiple codec streams or if the participant system is getting too hot to support transmission of multiple codec streams or the main battery has been drained too low to support transmission of the multiple codec streams, the participant system, in operation 203 in FIG. 3A, switches from transmitting a first stream encoded with a first (better) codec to transmitting a second stream encoded with the common codec; at some point during this switch, the participant system will stop transmitting the first stream so that it can transmit only the second stream to all recipients. The participant system 210 in the example shown in FIG. 3B will already be transmitting the second stream 219 to the participant system 214 (while also transmitting the first stream 217 to participant system 216) before operation 203 in FIG. 3A, so the switch can be performed by tagging or associating the second stream 219 with an identifier of the first stream 217, and this will cause the forwarding server 212 to forward the second stream to the participant system 216 (which had previously subscribed to the first stream). The tagging or association of the second stream with the first stream's identifier will automatically forward the second stream 219 to the participant system 216, and participant system 210 can stop transmitting the first stream 217 as soon as it begins tagging the second stream 219 with the identifier of the first stream. This tagging or association can be referred to as compound stream identifiers because the common codec stream is associated with two stream identifiers during the fallback situation. U.S. Pat. No. 10,931,725 provides further information about the use of compound stream identifiers for use in AV conferencing.

The fallback approach shown in FIGS. 3A and 3B allow a participant system that is transmitting at least a common codec stream and a better codec stream to immediately switch to transmitting only the common codec stream in a fallback situation (e.g., network degradation) without requiring signaling or messages about the change. Thus, such a participant system can react very quickly to changing conditions if necessary. Once conditions improve (e.g., the network bandwidth improved) the participant system can revert back to transmission of both the common codec stream 219 and the first stream 217 again; each participant system can perform operation 201 after a fallback situation to determine if it can resume transmission of both streams. Reverting back to transmitting both streams requires the participant system to begin generating and transmitting the first stream (encoded with the better codec) and stop tagging the second stream with the identifier of the first stream (which is associated with the identifier of the first stream).

The fallback approach shown in FIGS. 4A and 4B uses messages or signaling to accomplish the fallback and does not use compound stream identifiers. In operation 251 in FIG. 4A, each participant system monitors its local state; operation 251 can be similar to operation 201 in FIG. 3A. When the monitoring shows that fallback is required, the participant system (e.g., participant system 275) performs operation 253 by switching from transmitting both the better codec stream (the first stream) and the common codec stream to transmitting just the common codec stream. The method shown in FIG. 4A can operate in the context of the AV conference shown in FIG. 4B. This switch involves sending a message (e.g., stop 283 message shown in FIG. 4B) to the forwarding server (e.g., forwarding server 277) which in turn transmits a message to the participant systems (e.g., participant system 281) that have been receiving the first stream 283 from the participant system 275) that sent the stop 283 message, and this message from the forwarding server includes information that first stream 283 will not continue to be transmitted from participant system 275. Prior to operation 253, the participant system had already been creating and sending the common codec stream 285 to participant system 279 through the forwarding server 277, and the participant system had been transmitting the better codec stream 283 to the participant system 281. When the fallback condition occurs, the participant system 281 receives a message (e.g., data based on stop 283 message) and then subscribes to the common codec stream by sending a subscription message (e.g., subscribe to common) to the forwarding server 277. That subscription message causes the forwarding server 277 to begin forwarding the common codec stream to participant system 281. In one embodiment, the participant system 275 may stop creating and transmitting the better codec stream 283 once it has transmitted the stop 283 message to the forwarding server 277. The participants can continue to monitor their local states and resume transmission of the better codec stream when conditions allow this resumption. In one embodiment, resumption can involve publishing the availability of a new stream (the better codec stream) through the forwarding server which forwards the published availability to participant systems that can use the better codec stream; in turn these participant systems can subscribe to the better codec stream again.

Figure 5A:
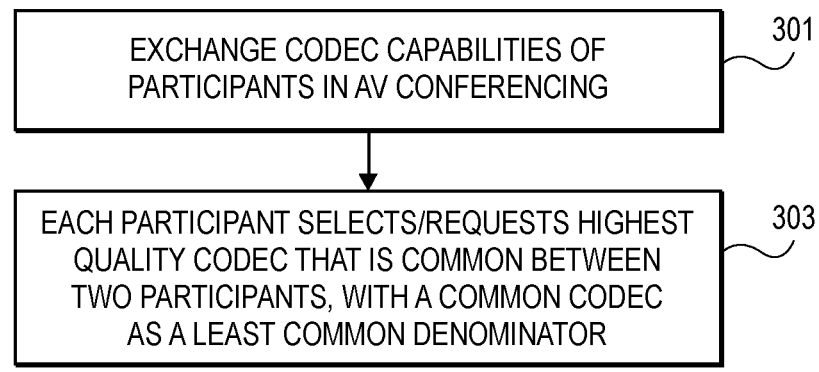
FIG. 5A is a flowchart that shows a method according to an embodiment that allows participant systems to select better codecs when other systems support those better codecs.
Figure 5B:
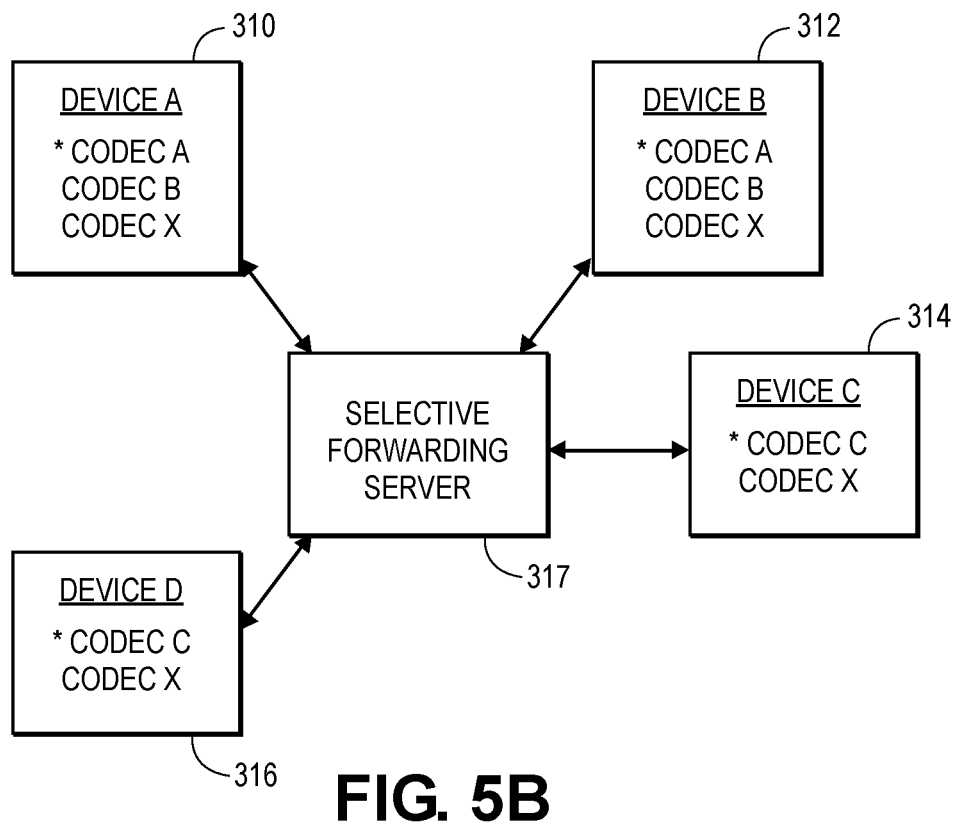
FIG. 5B shows an example of a set of participant systems and a server that can perform the method of FIG. 5A.

Another aspect of this disclosure involves the use of the preferred or highest quality codec at each participant system that can take advantage of such use while using a common codec that is available for use at all participant systems in an AV conference. The common codec can be used as the primary codec for some participants that do not support the better codecs (with variations in bitrate for steams encoded with the common codec being used to deal with network bandwidth changes) and can also be used as a fallback codec for those participant systems that can support the better codecs. This aspect is shown in FIG. 5A, which shows a method of an embodiment of this aspect, and FIG. 5B, which shows an example of an AV conference environment that can use the method shown in FIG. 5A. In operation 301 in FIG. 5A, each participant system can exchange their list of codec capabilities (and optionally other media related capabilities) for use in the AV conference with all of the other participant systems (or at least a subset of all participant systems). For example, each participant system can publish their list of capabilities through one or more messages sent to a forwarding server, such as the forwarding server 317 shown in FIG. 5B. The result of this exchange can provide each participant with the available codecs at other participants and allow each participant to select a codec from the other participants' list of available codecs. This enables operation 303 in which each participant can subscribe to a preferred or highest quality codec available at each participant (for those participants that support more than the common codec) while allowing for such participant systems to fallback to use of the common codec in fallback situations. The fallback situations can use the fallback approaches described above. In the example shown in FIG. 5B, participant system 310 and participant system 312 each have the same set of codec capabilities, which include a common codec (codec X). Participant systems 316 and 314 each have the same set of codec capabilities which include the common codec. In this example, participant systems 310 and 312 can select a better codec, such as codecs A or B, when not in a fallback condition (e.g., when network bandwidth is too low) to transmit and receive streams between these systems 310 and 312 in the AV conference, and these participant systems 310 and 312 can transmit and receive common codec encoded streams to participants 316 and 314. The participants 316 and 314 can transmit and receive the common codec streams from all other participants. The common codec stream can be used as a fallback stream for participants 310 and 312 when fallback conditions (e.g., reduced network bandwidth or thermal state too hot or battery level too low) exist.

The embodiments described herein can also use additional methods performed by server systems, such as forwarding servers, to match the different participant systems. For example, a server, in one embodiment, can manipulate, add, or remove media headers and control commands to match different participant systems, with different media capabilities, so they can join and maintain an AV conference. For example, a server can assist participant systems that are different with loss recovery, media synchronization, media attributes such as orientation of images/video, and media attributes such as audio power (e.g., volume) levels, and transport headers and additional encryption if needed.

Figure 6:
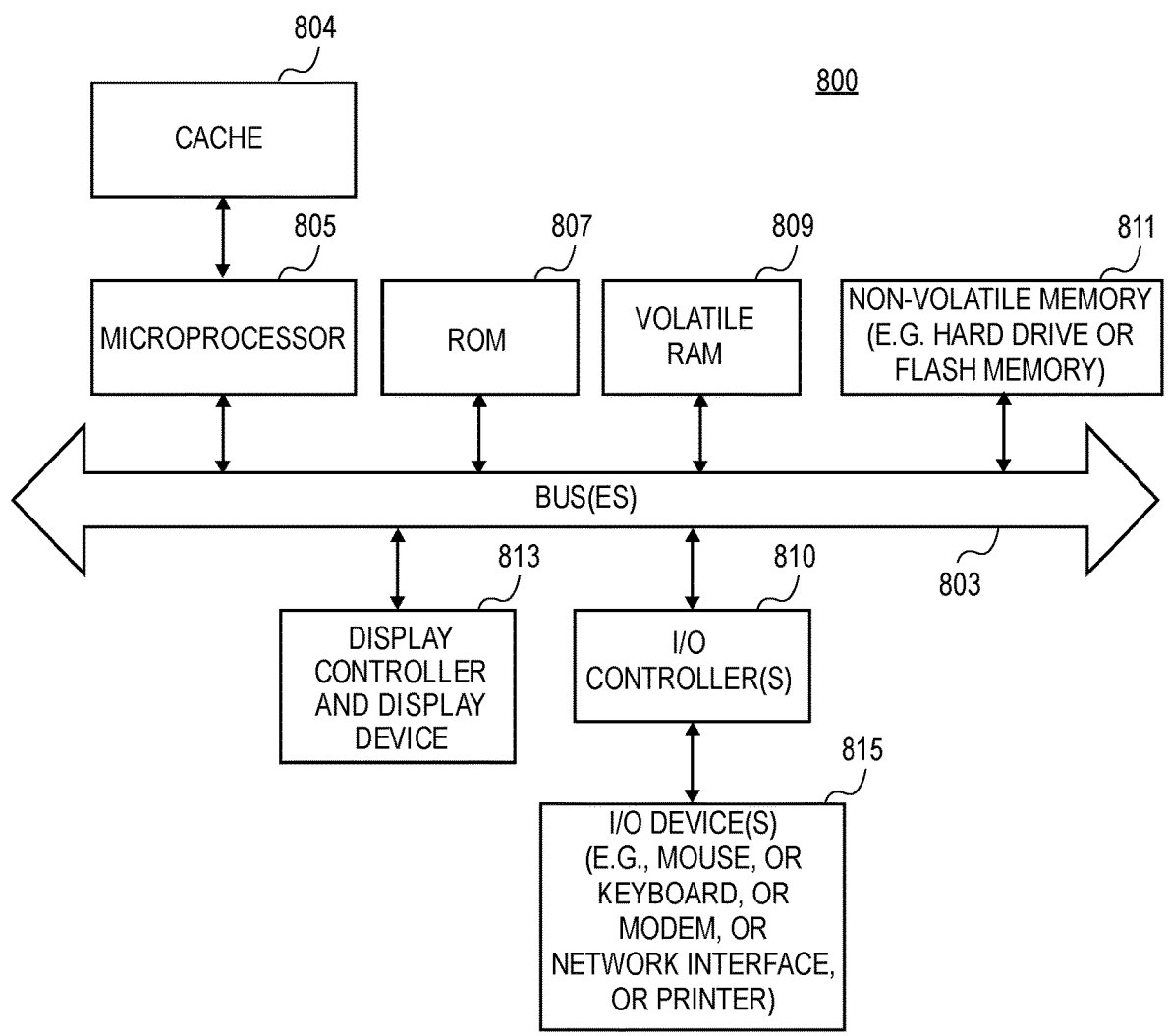
FIG. 6 shows an example of a data processing system that can be used to implement a participant system or a server system (e.g., a forwarding server).

FIG. 6 shows one example of a data processing system 800, which may be used with one embodiment. For example, the system 800 may be implemented to provide a system or device that performs any one of the methods described herein. For example, the system 800 may be used to implement a participant system or a forwarding server. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a first data processing system cause the first data processing system to perform a method in an environment that includes the first data processing system and a second data processing system and a third data processing system and a server, the method comprising:
    transmitting, by the first data processing system to the server, codec capabilities of the first data processing system, the codec capabilities of the first data processing system indicating a first plurality of codecs in the first data processing system that are available for use in an audiovisual (AV) conference, wherein each codec in the first plurality of codecs and in the second plurality of codecs is configured to compress video content in an AV conference for transmission to other participants in the AV conference and is configured to decompress video content received in the AV conference;
    receiving, by the first data processing system, a second plurality of codec capabilities of the second data processing system, the second set of codec capabilities indicating a second set of codecs in the second data processing system that are available for use in the AV conference;
    receiving, at the first data processing system, a request from the second data processing system to receive a first stream, encoded with a first codec, in the AV conference, the first codec in the first plurality of codecs in the first data processing system;
    transmitting, by the first data processing system to the server, the first stream for delivery to the second data processing system;
    receiving, by the first data processing system, a request from the third data processing system for a second stream, encoded with a second codec, in the AV conference, the second codec being in the first plurality of codecs and being different than the first codec, wherein the first codec is available for use in the first and second data processing systems but not available for the third data processing systems, the second codec is a codec that is common to and available for use in the first, the second and the third data processing systems, and the second codec is a common codec for usage among the first, second, and third data processing systems when a fallback condition exists;
    creating, on demand and in response to the request from the third data processing system, the second stream in the AV conference; and
    transmitting the second stream to the server for delivery to the third data processing system while the first data processing system continues to transmit the first stream to the server for delivery to the second data processing system.

2. The non-transitory machine readable medium as in claim 1 wherein the first and the second data processing systems execute one or more versions of a first operating system during the AV conference and the third data processing system executes a second operating system during the AV conference.

3. The non-transitory machine readable medium as in claim 1, wherein the method further comprises:
    receiving, at the first data processing system, a third stream in the AV conference from the second data processing system, the third stream encoded with the first codec; decoding the third stream using the first codec; receiving, at the first data processing system, a fourth stream in the AV conference from the third data processing system, the fourth stream encoded with the second codec; decoding the fourth stream using the second codec at the first data processing system; and displaying video from the third stream, video from the fourth stream and video from the first stream on a display of the first data processing system.

4. The non-transitory machine readable medium as in claim 1, wherein the method further comprises:
    monitoring, by the first data processing system, one or more of: uplink bandwidth from the first data processing system, thermal data about a thermal state of the first data processing system, or battery state about a battery in the first data processing system;
    in response to one or more conditions determined from the monitoring, switching from transmitting to the second data processing system the first stream to transmitting to the second data processing system the second stream.

5. The non-transitory machine readable medium as in claim 4, wherein the switching comprises: associating the second stream with a stream identifier of the first stream to cause the server to forward the second stream to the second data processing system.

6. The non-transitory machine readable medium as in claim 4, wherein the method further comprises:
    transmitting, by the first data processing system, an indication to the server, for delivery to the second data processing system, that the first data processing system has or will stop transmitting the first stream for delivery to the second data processing system;

receiving a request, from the second data processing system, for the second stream;

transmitting, by the first data processing system, the second stream to the server for delivery to the second data processing system.

7. A method performed by a server in an environment that includes the server, a first data processing system and a second data processing system and a third data processing system, the method comprising:

receiving, by the server from the first data processing system, codec capabilities of the first data processing system, the codec capabilities of the first data processing system indicating a first plurality of codecs in the first data processing system that are available for use in an audiovisual (AV) conference, wherein each codec in the first plurality of codecs and in the second plurality of codecs is configured to compress video content in an AV conference for transmission to other participants in the AV conference and is configured to decompress video content received in the AV conference;

transmitting, by the server to the first data processing system, a second plurality of codec capabilities of the second data processing system, the second plurality of codec capabilities indicating a second plurality of codecs in the second data processing system that are available for use in the AV conference;

transmitting, by the server to the first data processing system, a request from the second data processing system to receive a first stream, encoded with a first codec, in the AV conference, the first codec in the first plurality of codecs in the first data processing system;

receiving, by the server from the first data processing system, the first stream for delivery to the second data processing system;

transmitting, by the server to first data processing system, a request from the third data processing system for a second stream, encoded with a second codec, in the AV conference, the second codec being in the first set of codecs and being different than the first codec, wherein the first codec is available for use in the first and second data processing systems but not available for the third data processing systems, the second codec is a codec that is common to and available for use in the first, the second and the third data processing systems, and the second codec is a common codec for usage among the first, second, and third data processing systems when a fallback condition exists; and receiving the second stream at the server for delivery to the third data processing system while the server continues to transmit the first stream to the second data processing system.

8. The method as in claim 7, wherein the method further comprises:

switching from transmitting to the second data processing system the first stream to transmitting to the second data processing system the second stream.

9. The method as in claim 8, wherein the switching comprises: receiving a stream identifier for the second stream to cause the server to forward the second stream to the second data processing system.

10. The method as in claim 8, wherein the method further comprises:

receiving, by the server from the first data processing system, an indication, for delivery to the second data processing system, that the first data processing system has or will stop transmitting the first stream for delivery to the second data processing system;

transmitting a request, from the second data processing system, for the second stream;

receiving, by the server from the first data processing system, the second stream for delivery to the second data processing system.

11. A method performed by a first data processing system in an environment that includes the first data processing system and a second data processing system and a third data processing system and a server, the method comprising:

transmitting, by the first data processing system to the server, codec capabilities of the first data processing system, the codec capabilities of the first data processing system indicating a first plurality of codecs in the first data processing system that are available for use in an audiovisual (AV) conference, wherein each codec in the first plurality of codecs and in the second plurality of codecs is configured to compress video content in an AV conference for transmission to other participants in the AV conference and is configured to decompress video content received in the AV conference;

receiving, by the first data processing system, a second set of codec capabilities of the second data processing system, the second plurality of codec capabilities indicating a second set of codecs in the second data processing system that are available for use in the AV conference;

receiving, at the first data processing system, a request from the second data processing system to receive a first stream, encoded with a first codec, in the AV conference, the first codec in the first plurality of codecs in the first data processing system;

transmitting, by the first data processing system to the server, the first stream for delivery to the second data processing system;

receiving, by the first data processing system, a request from the third data processing system for a second stream, encoded with a second codec, in the AV conference, the second codec being in the first plurality of codecs and being different than the first codec, wherein the first codec is available for use in the first and second data processing systems but not available for the third data processing systems, the second codec is a codec that is common to and available for use in the first, the second and the third data processing systems, and the second codec is a common codec for usage among the first, second, and third data processing systems when a fallback condition exists;

creating, on demand and in response to the request from the third data processing system, the second stream in the AV conference; and transmitting the second stream to the server for delivery to the third data processing system while the first data processing system continues to transmit the first stream to the server for delivery to the second data processing system.

12. The method as in claim 11 wherein the first and the second data processing systems execute one or more versions of a first operating system during the AV conference and the third data processing system executes a second operating system during the AV conference.

13. The method as in claim 11, wherein the method further comprises:

receiving, at the first data processing system, a third stream in the AV conference from the second data processing system, the third stream encoded with the first codec; decoding the third stream using the first codec; receiving, at the first data processing system, a fourth stream in the AV conference from the third data processing system, the fourth stream encoded with the second codec; decoding the fourth stream using the second codec at the first data processing system; and displaying video from the third stream, video from the fourth stream and video from the first stream on a display of the first data processing system.

14. The method as in claim 11, wherein the method further comprises:
monitoring, by the first data processing system, one or more of: uplink bandwidth from the first data processing system, thermal data about a thermal state of the first data processing system, or battery state about a battery in the first data processing system;
in response to one or more conditions determined from the monitoring, switching from transmitting to the second data processing system the first stream to transmitting to the second data processing system the second stream.

15. The method as in claim 14, wherein the switching comprises: associating the second stream with a stream identifier of the first stream to cause the server to forward the second stream to the second data processing system and the first codec is available for use in the first and second data processing systems but not available for the third data processing systems.

16. The method as in claim 14, wherein the method further comprises:
transmitting, by the first data processing system, an indication to the server, for delivery to the second data processing system, that the first data processing system has or will stop transmitting the first stream for delivery to the second data processing system;
receiving a request, from the second data processing system, for the second stream;
transmitting, by the first data processing system, the second stream to the server for delivery to the second data processing system.

17. A non-transitory machine readable medium storing executable program instructions which when executed by a first data processing system cause the first data processing system to perform a method in an environment that includes the first data processing system and a second data processing system and a server, the method comprising:
transmitting, by the first data processing system to the server, codec capabilities of the first data processing system, the codec capabilities of the first data processing system indicating a first set of codecs in the first data processing system that are available for use in an audiovisual (AV) conference, wherein each codec in the first plurality of codecs and in the second plurality of codecs is configured to compress video content in an AV conference for transmission to other participants in the AV conference and is configured to decompress video content received in the AV conference;
receiving, by the first data processing system, a second set of codec capabilities of the second data processing system, the second set of codec capabilities indicating a second set of codecs in the second data processing system that are available for use in the AV conference;
transmitting, by the first data processing system to the server, a request for a first stream encoded by a first codec at the second data processing system, the request based on criteria at the first data processing system of a highest quality codec that is common to the first and the second sets of codecs, wherein a second codec being in the first plurality of codecs and being different than the first codec, is used between the first data processing system and a third data processing system, the first codec is available for use in the first and second data processing systems but not available for the third data processing systems, the second codec is a codec that is common to and available for use in the first, the second and the third data processing systems, and the second codec is a common codec for usage among the first, second, and third data processing systems when a fallback condition exists.

18. The non-transitory machine readable medium as in claim 1 wherein the fallback condition is one of reduced network bandwidth, hot thermal state, or low battery level.

* * * * *